(12) United States Patent
Struziak et al.

(10) Patent No.: US 8,147,143 B2
(45) Date of Patent: Apr. 3, 2012

(54) BUMP FOIL HYDRODYNAMIC THRUST BEARING

(75) Inventors: Ronald Struziak, Longmeadow, MA (US); Christopher McAuliffe, Windsor, CT (US); Brent Merritt, Southwick, MA (US); Seth Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 2052 days.

(21) Appl. No.: 10/947,570

(22) Filed: Sep. 22, 2004

(65) Prior Publication Data

US 2006/0062500 A1   Mar. 23, 2006

(51) Int. Cl.
*F16C 32/06* (2006.01)
(52) U.S. Cl. ......................... 384/105; 384/103
(58) Field of Classification Search ................ 384/103, 384/104, 105, 106
See application file for complete search history.

(56) References Cited

U.S. PATENT DOCUMENTS

| | | | |
|---|---|---|---|
| 4,082,375 A | 4/1978 | Fortmann et al. | |
| 4,213,657 A * | 7/1980 | Gray | 384/105 |
| 4,247,155 A | 1/1981 | Fortmann et al. | |
| 4,277,111 A | 7/1981 | Gray et al. | |
| 4,415,281 A * | 11/1983 | Agrawal | 384/103 |
| 4,462,700 A | 7/1984 | Agrawal | |
| 4,597,677 A * | 7/1986 | Hagiwara et al. | 384/105 |
| 5,110,220 A | 5/1992 | Gu et al. | |
| 5,248,205 A | 9/1993 | Gu et al. | |
| 5,318,366 A | 6/1994 | Nadjafi et al. | |
| 5,540,505 A | 7/1996 | Struziak et al. | |
| 5,547,286 A | 8/1996 | Struziak et al. | |
| 5,584,582 A * | 12/1996 | Brown | 384/106 |
| 5,833,369 A * | 11/1998 | Heshmat | 384/105 |
| 5,961,217 A | 10/1999 | Heshmat | |
| 6,158,892 A * | 12/2000 | Stewart et al. | 384/105 |
| 2006/0062500 A1 | 3/2006 | Struziak et al. | |

FOREIGN PATENT DOCUMENTS

EP          0 717 207 A1       6/1996

OTHER PUBLICATIONS

International Search Report, Jun. 4, 2006.
Current State of the art two piece thrust bearing.
European Search Report for European Application No. 08251459.7, Jul. 25, 2008.

* cited by examiner

*Primary Examiner* — Justin Krause
(74) *Attorney, Agent, or Firm* — Carlson, Gaskey & Olds, P.C.

(57) ABSTRACT

A thrust bearing for a rotary machine includes first, second and third layers. The second layer includes a corrugated foil arranged between the first and third layers. The corrugated foil includes a wall having peaks engaging the first layer and valleys engaging the third layer. A depression is arranged in the wall between first and second peaks. The depression is spaced from the first and third layers. The first layer includes multiple arcuate top foils that are arranged adjacent to a thrust runner of a rotatable shaft. A corresponding number of arcuate corrugated foils may be used to support the top foils. The third layer, which is provided by an annular main plate, includes multiple arcuate spacers arranged circumferentially on the main plate. The spacers are generally aligned with a trailing edge of the top foils. The depressions decrease the stiffness of the bump foils. The spacers direct the axial load through the thrust bearing in a desired manner.

8 Claims, 2 Drawing Sheets

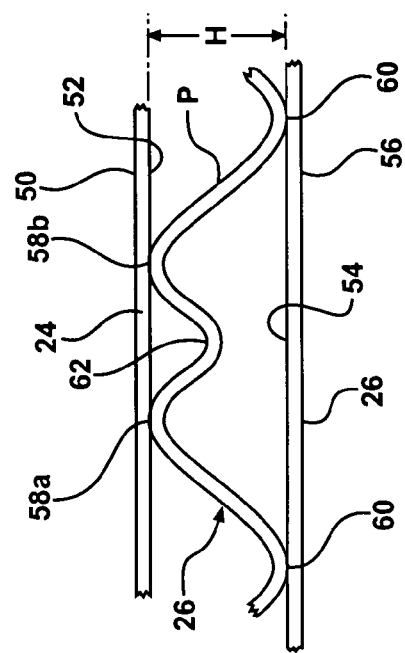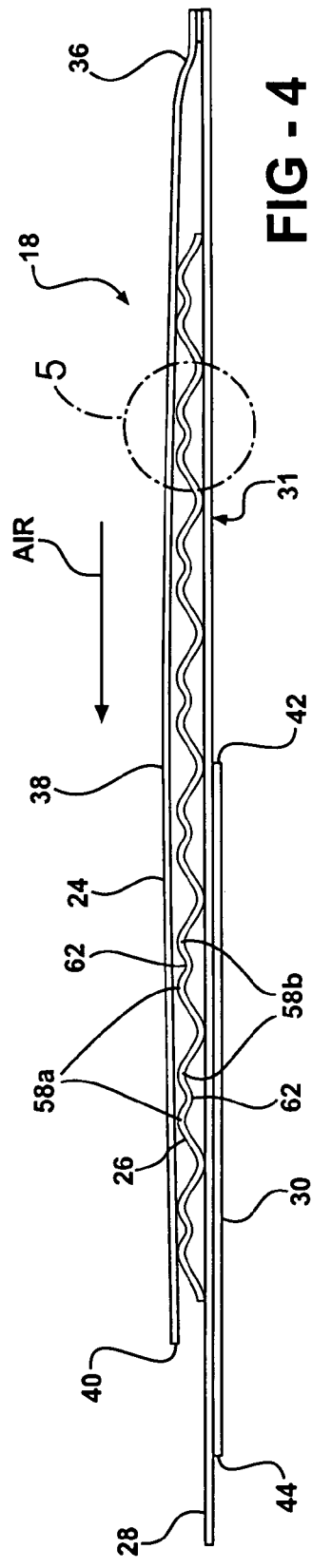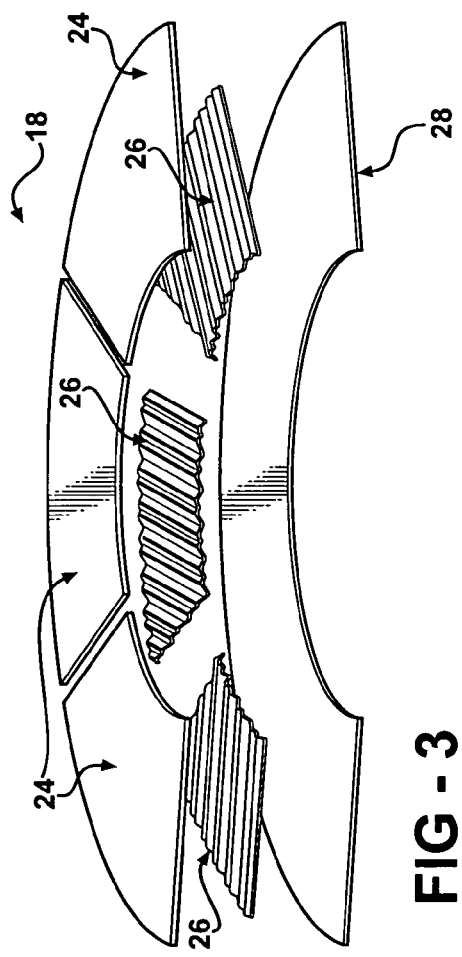

BUMP FOIL HYDRODYNAMIC THRUST BEARING

BACKGROUND OF THE INVENTION

This invention relates to hydrodynamic thrust bearings for use in rotating machinery.

Hydrodynamic thrust bearings generate a lubricating non-linear air film between a portion of a rotating shaft, typically referred to a thrust runner, and the bearing. One typical bearing arrangement utilizes two welded subassemblies. The top subassembly includes an annular main plate having multiple arcuate, corrugated foils welded to the main plate. A corresponding number of arcuate top foils are supported by the bump foils. The bottom subassembly includes another annular main plate having multiple arcuate bump foils welded to the main plate.

The top foils are arranged adjacent to the thrust runner, and the bump foils of the bottom subassembly are arranged adjacent to static structure. The two main plates of the subassemblies are arranged adjacent to one another. The bump foils of the subassemblies are arranged beneath one another or staggered slightly. The overlapping bump foils together provide a desired spring rate to cushion the thrust runner as the shaft moves axially. The bump foils include peaks adjoining the top foils and valleys adjoining the main plates.

Prior art thrust bearings are expensive to manufacture since they include many components that must be assembled. Further, the prior art thrust bearing is not cooled very efficiently. Only about half of the air that flows through the bump foils is used to cool the top foils. The flow of air through the bump foils in the bottom subassembly is essentially wasted since the bottom bump foils are insolated by the main plates.

What is needed is an improved hydrodynamic thrust bearing that uses fewer components and is cooled more effectively.

SUMMARY OF THE INVENTION

The present invention provides a thrust bearing for a rotary machine. The thrust bearing includes first, second and third layers. The second layer includes a corrugated foil arranged between the first and third layers. The corrugated foil includes a wall having peaks engaging the first layer and valleys engaging the third layer. A depression is arranged in the wall between first and second peaks. The depression is spaced from the first and third layers.

More specifically, the first layer includes multiple arcuate top foils that are arranged adjacent to a thrust runner of a rotatable shaft. A corresponding number of arcuate corrugated foils may be used to support the top foils. The peaks, valleys, and depressions are arranged generally parallel to one another. The third layer, which is an annular main plate, includes multiple arcuate spacers arranged circumferentially on the main plate. The spacers are generally aligned beneath a trailing edge of the top foils.

The depressions decrease the stiffness of the bump foils. The spacers direct the axial load into the thrust bearing in a desired manner.

Accordingly, the present invention provides an improved hydrodynamic thrust bearing that uses fewer components and is cooled more effectively.

These and other features of the present invention can be best understood from the following specification and drawings, the following of which is a brief description.

BRIEF DESCRIPTION OF THE DRAWINGS

FIG. 3 is a partial exploded view of the thrust bearing shown in FIG. 2.

FIG. 4 is a cross-sectional view of the thrust bearing shown in FIG. 2 taken along line 4-4.

FIG. 5 is an enlarged view of the circled area depicted at 5 in FIG. 4.

DETAILED DESCRIPTION OF THE PREFERRED EMBODIMENT

Figures 1, 2:
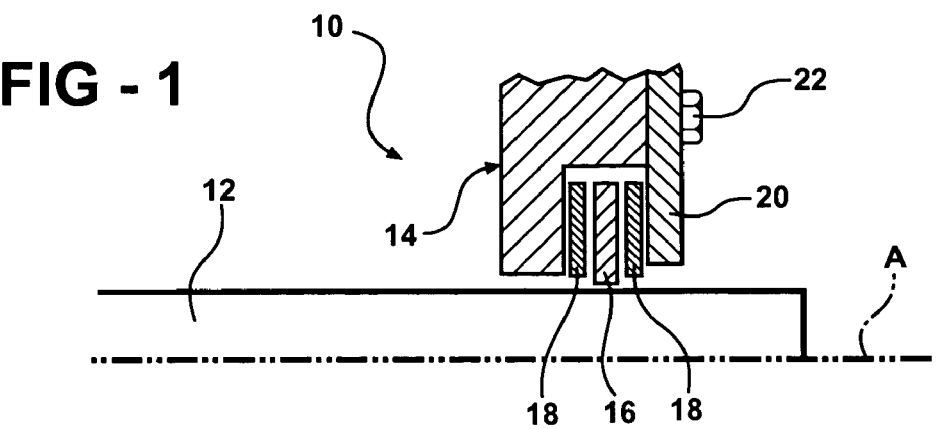
FIG. 1 is a cross-sectional view of a portion of a rotating machine.
FIG. 2 is a top elevational view of an inventive thrust bearing.

A rotating machine 10 is shown in FIG. 1. The machine 10 includes a shaft 12 rotating about an axis A. The shaft 12 is arranged within a housing 14 and includes an annular thrust runner 16 that extends radially from the shaft 12. Thrust bearings 18 are arranged on either side of the thrust runner 16. The thrust runner 16 and thrust bearings 18 are retained between a housing portion 20 secured to another portion of the housing by a fastener 22, for example. Air is supplied to the thrust bearings 18 by a passage (not shown) in the housing 14, as is known in the art. During rotation of the shaft 12 relative to the housing 14, a hydrodynamic layer or air film is generated between the thrust bearings 18 and thrust runner 16 to reduce friction. Air routed to the thrust bearings 18 from the passage is also used to cool the thrust bearings 18.

A thrust bearing 18 of the present invention is shown in FIG. 2-4. The thrust bearing 18 includes three layers, unlike the prior art five-layer thrust bearings. A first layer is provided by multiple arcuate top foils 24 that are spaced circumferentially relative to one another. The top foils 24 are supported by a second layer having a corresponding number of arcuate bump foils 28 arranged circumferentially beneath the top foils 24. The bump foils 26 are corrugated to provide cushioning and accommodate a cooling airflow through the thrust bearing 18. A third layer is provided by an annular main plate 28 that supports the bump foils 26.

The top foils 24 are arranged adjacent to the thrust runner 16 and the main plate 28 is arranged adjacent to the housing 14. The top foils may be coated in a dry film lubricant such as Teflon. The three layers are secured to one another, for example, by spot welding. Additionally, several of the spacers 42 may include notches 32 that receive tabs 34 extending from the main plate 28. The tabs 34 are received by the housing 14.

Referring to FIGS. 2 and 4, the top foils 24 include a leading edge 36 and extends to a trailing edge 40. The top foil 24 includes a crown portion 38 so that the top foil 24 bows outward toward the thrust runner 16 to generate a desired air film and enhance absorption of axially loading from the thrust runner.

The main plate 28 includes arcuate spacers 30 having first and second spaced apart edges 42 and 44. The first edge 42 is arranged between the leading and trailing edges 36 and 40 in the example shown. The second edge 44 extends slightly beyond the trailing edge 40, but is aligned approximately with the trailing edges 40 in the example shown. The spacers 30 are arranged beneath a trailing edge side of the top foils 24. The spacers 30 direct the axial loading through the bump foils 26 into the housing 14 in a desired manner. The spacers 30 may be separate components secured to the main plate 28. Alternatively, the main plate 28 may be chemically etched forming a recessed area 31 to provide the spacers 30. The spacers 30 provide a third layer having a thickened area. The alternating thickened and recessed area provide dampening in addition to that provided by the bump foils 28.

The thrust bearings 18 include inner an outer circumferences 46 and 48. In the example shown, the top foils 24 and main plate 28 extend to the inner and out circumferences 46 and 50. The bump foils 26 are arrange radially inboard of the inner and outer circumference 46 and 48, and the inner periphery of the spacers 30 are arranged still further inboard of the bump foils 26.

Referring to FIG. 5, the top foils 24 include inner and outer surfaces 52 and 50. The outer surface 50 is adjacent to the thrust runner 16. The main plate 28 includes inner and outer surfaces 54 and 56. With the outer surface 56 arranged adjacent to the housing 14. The bump foils 26 are provided by a corrugated wall having peaks 58 and valley 60. The peaks 58 engage the inner surface 52 to support the top foils 24. The valleys 60 engage the inner surface 54 thereby supporting and directing the axial loads from the top foils 24 into the main plate 28.

The peak nearest the leading edge 36 is generally collinear with a radius R1 extending from the axis A, as shown in FIG. 2. The peaks 58a and 58b and valleys 60 are arranged generally parallel to one another. The peaks and valleys 58a, 58b and 60 are canted relative to other radii R2 extending from the axis A.

Unlike the prior art, only one layer of bump foils 24 are used. The two layers of bump foils in the prior art were arranged in series, which provides an arrangement having a reduced stiffness relative to a single layer of similarly configured bump foils. To reduce the stiffness of single layer of bump foils 24, the present invention is designed with a desired pitch P and height H between the peaks and valleys 58 and 60.

Increasing the height H between the peaks and valleys 58 and 60 can reduce the stiffness, but is undesirable after a particular point. Decreasing the pitch to reduce stiffness reduces the numbers of peaks and valleys 58 and 60 that would engage the top foils 24 and main plate 28, which undesirably reduces the support provided by the bump foils 26. The present invention employs depressions 62 arranged between first and second peaks 58a and 58b. The depressions 62 run parallel with the peaks 58a and 58b and valleys 60. The depressions 62 are spaced from the top foils 24 and main plate 28 to reduce the stiffness of the bump foils 26. The pitch P of the inventive bump foils 26 can remain the same or made smaller as compared to prior art two-layered thrust bearing bump foils.

Air flowing through the corrugated bump foils 26 is better able to cool the thrust bearing 18 since the air flow is in closer proximity to the heat generating top foils 24.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A thrust bearing comprising:
   first, second and third layers, the second layer including a corrugated foil arranged between the first and third layers, the corrugated foil including a wall providing first and second peaks engaging the first layer and first and second valleys engaging the third layer, the first and second peaks arranged between the first and second valleys in a circumferential direction, and a depression arranged in the wall between the first and second peaks, the depression spaced from the first and third layers in an axial direction that is transverse to the circumferential direction, wherein the second layer includes spaced apart, arcuate corrugated foils, and the first layer includes arcuate top foils, the top foils including a leading edge secured to the third layer with the corrugated foils arranged between the top foils and the third layer.

2. The thrust bearing according to claim 1, wherein the third layer includes spacers provided on an annular main plate opposite the corrugated foils, the spacers providing recessed areas arranged circumferentially between one another, the spacers arranged beneath the top foils on a trailing edge side that is opposite the leading edge.

3. The thrust bearing according to claim 2, wherein the top foils are bowed outward away from the main plate providing a crown between the leading edge and the trailing edge side.

4. A rotary machine comprising:
   a housing;
   a shaft rotatable about an axis relative to the housing, and a thrust runner secured to the shaft and extending radially outward from the axis; and
   a thrust bearing arranged between the housing and the shaft, the thrust bearing including first, second and third layers, the first layer adjacent to the thrust runner and the third layer adjacent to the housing, the second layer including a corrugated foil arranged between the first and third layers, the corrugated foil including a wall providing peaks engaging the first layer and valleys engaging the third layer, and a depression arranged in the wall between first and second peaks, the depression spaced from the first and third layers, wherein the thrust bearing includes a single corrugated foil layer, wherein the first layer includes arcuate top foils and the third layer includes an annular main plate, a leading edge of the top foils secured to the main plate, the second layer providing arcuate corrugated foils engaging the top foils and the main plate.

5. The rotary machine according to claim 4, wherein arcuate spacers are provided on the main plate opposite the corrugated foils, the spacers arranged beneath a trailing edge side of the top foils.

6. The rotary machine according to claim 5, wherein the shaft moves axially directing an axial load into the top foils through the corrugated foils to the spacers.

7. The rotary machine according to claim 6, wherein the first layer engages the thrust runner, and the third layer engages the housing.

8. The rotary machine according to claim 4, wherein the top foils generate a hydrodynamic air film between the thrust bearing and thrust runner.

* * * * *